(12) United States Patent
Wessel et al.

(10) Patent No.: US 8,582,237 B2
(45) Date of Patent: Nov. 12, 2013

(54) SELECTIVELY MAGNETIC WRITE GAP INSERT

(75) Inventors: James Gary Wessel, Savage, MN (US); Mourad Benakli, Bloomington, MN (US); Raul Horacio Andruet, Woodbury, MN (US); Kirill A. Rivkin, Edina, MN (US); Sarbeswar Sahoo, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 94 days.

(21) Appl. No.: 13/158,719

(22) Filed: Jun. 13, 2011

(65) Prior Publication Data
US 2012/0314325 A1 Dec. 13, 2012

(51) Int. Cl.
*G11B 5/127* (2006.01)

(52) U.S. Cl.
USPC .................................................. 360/125.3

(58) Field of Classification Search
USPC ............ 360/125.3, 125.03, 125.09, 125.04, 360/125.17, 125.12, 125.16, 125.06, 360/125.15, 125.26, 125.71, 317, 123.1
See application file for complete search history.

(56) References Cited

U.S. PATENT DOCUMENTS

| | | | |
|---|---|---|---|
| 4,899,244 A * | 2/1990 | Morse | 360/133 |
| 5,379,439 A * | 1/1995 | Harrison et al. | 360/72.1 |
| 5,446,613 A * | 8/1995 | Rottmayer | 360/319 |
| 6,459,260 B1 * | 10/2002 | Bonin et al. | 324/750.25 |
| 6,486,660 B1 * | 11/2002 | Luse et al. | 324/210 |
| 6,562,251 B1 * | 5/2003 | Jordan | 216/22 |
| 6,562,278 B1 * | 5/2003 | Farnworth et al. | 264/401 |
| 7,009,812 B2 | 3/2006 | Hsu et al. | |
| 7,088,537 B2 * | 8/2006 | Cronch et al. | 360/66 |
| 7,127,799 B2 * | 10/2006 | Girard et al. | 29/603.1 |
| 7,684,150 B2 * | 3/2010 | Pokhil et al. | 360/125.57 |
| 7,688,544 B1 | 3/2010 | Mallary et al. | |
| 7,886,422 B1 * | 2/2011 | Zhou et al. | 29/603.02 |
| 7,894,159 B2 * | 2/2011 | Lengsfield et al. | 360/125.03 |
| 7,983,002 B2 * | 7/2011 | Pust et al. | 360/125.04 |
| 8,063,709 B2 * | 11/2011 | Firastrau et al. | 331/94.1 |
| 8,198,919 B1 * | 6/2012 | Kozhanov et al. | 326/104 |
| 2002/0114111 A1 * | 8/2002 | Zhu | 360/324.1 |
| 2002/0149886 A1 * | 10/2002 | Gill | 360/317 |
| 2005/0200997 A1 * | 9/2005 | Cronch et al. | 360/55 |
| 2006/0002020 A1 * | 1/2006 | Pokhil et al. | 360/126 |
| 2006/0056114 A1 * | 3/2006 | Fukumoto et al. | 360/324.2 |
| 2006/0245108 A1 | 11/2006 | Hsu et al. | |
| 2007/0019327 A1 | 1/2007 | Maruyama et al. | |
| 2008/0030897 A1 | 2/2008 | Gill et al. | |
| 2008/0259498 A1 * | 10/2008 | Lengsfield et al. | 360/235.4 |
| 2009/0002895 A1 * | 1/2009 | Pust et al. | 360/319 |
| 2010/0039181 A1 * | 2/2010 | Firastrau et al. | 331/94.1 |
| 2010/0214692 A1 | 8/2010 | Kief et al. | |
| 2011/0007431 A1 * | 1/2011 | Braganca et al. | 360/324.12 |
| 2011/0109999 A1 * | 5/2011 | Benakli et al. | 360/319 |
| 2012/0154063 A1 * | 6/2012 | Nikonov et al. | 331/94.1 |

\* cited by examiner

*Primary Examiner* — Allen T Cao
(74) *Attorney, Agent, or Firm* — Hall Estill Attorneys at Law

(57) ABSTRACT

A selectively magnetic insert that is capable of enhancing magnetic writing, such as in use as a data transducing head. In accordance with various embodiments, a write pole is in contact with a selectively magnetic insert that decouples the write pole from at least one adjacent shield in response a powered operation.

20 Claims, 4 Drawing Sheets ment in which various embodiments of the present invention can be advantageously practiced. It will be understood, however, that the claimed subject matter is not so limited by such exemplary environment.

SELECTIVELY MAGNETIC WRITE GAP INSERT

SUMMARY

Various embodiments of the present invention are generally directed to a selectively magnetic insert that is capable of enhancing data recording.

In accordance with various embodiments, a write pole is in contact with a selectively magnetic insert that decouples the write pole from at least one adjacent shield in response a powered operation.

These and other features and advantages which characterize the various embodiments of the present invention can be understood in view of the following detailed discussion and the accompanying drawings.

DETAILED DESCRIPTION

As electronics devices become more sophisticated, demand for higher data capacity has placed added emphasis on reducing the size of data written to a data storage media. While erase after write (EAW), which is a situation where residual magnetic flux is emitted from an unpowered writer that erases data on the disk, has always been a concern for magnetic disk drives, its propensity increases on reduced form factor data writers. The present disclosure is generally directed to enhancing data recording through the reduction in erase after write situations, such as in the context of writing elements used in data transducing heads.

Accordingly, a write pole can be positioned to contact a selectively magnetic insert that decouples the write pole from at least one adjacent shield in response a powered operation. Heat generated in or near the write the write pole warms the insert past its transition temperature so that the insert becomes nonmagnetic such that its effect on recording is equivalent to the standardly employed gap materials. More specifically, once heated above its transition temperature the insert has negligible moment and negligible permeability. When the write pole is not powered, the magnetic insert is activated to magnetically couple the write pole to the adjacent shield, which provides a dissipation pathway for residual magnetic flux to the shields and keeps the flux from reaching and affecting the programmed data on an adjacent data media.

Figure 1:
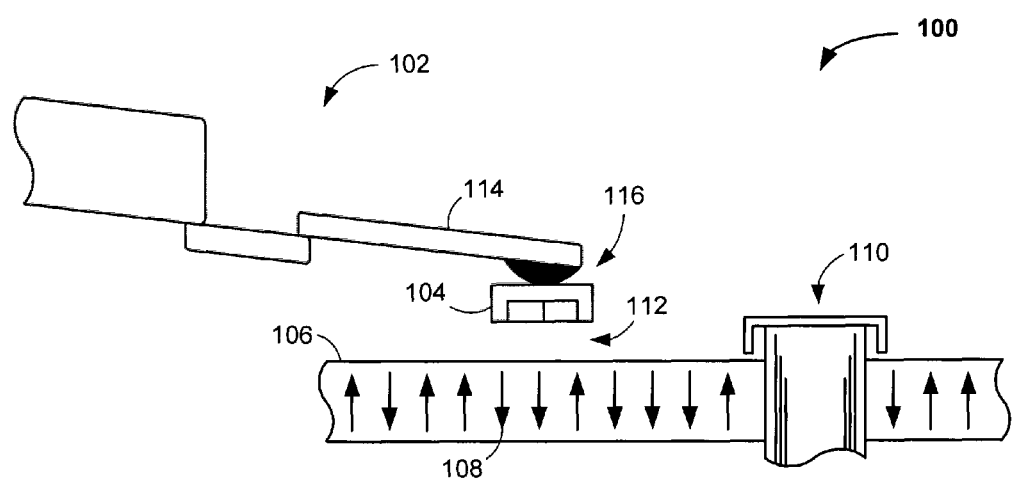
FIG. 1 is a block representation of an exemplary portion of a data storage device.

Turning to the drawings, an exemplary data transducing portion 100 of a data storage device is provided in FIG. 1. The transducing portion 100 is shown in an exemplary environment in which various embodiments of the present invention can be advantageously practiced. It will be understood, however, that the claimed subject matter is not so limited by such exemplary environment.

The transducing portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 106.

The transducing head 104 can include one or more transducing elements, such as a magnetic writer and magnetically responsive reader, which operate to program and read data from the storage media 106, respectively. In this way, controlled motion of the actuating assembly 102 induces the transducers to align with data tracks (not shown) defined on the storage media surfaces to write, read, and rewrite data.

Figure 2:
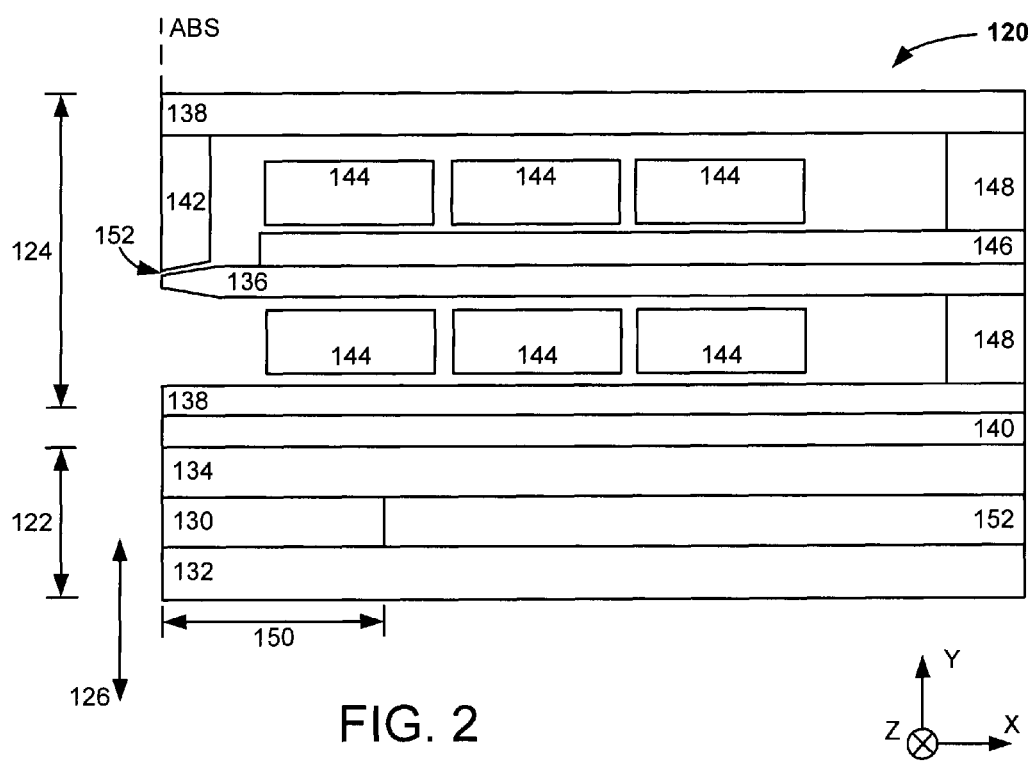
FIG. 2 generally illustrates an exemplary magnetic element capable of being used in the portion of the data storage device displayed in FIG. 1.

FIG. 2 displays an exemplary cross-sectional block representation of a transducing head 120 that is capable of being used in the actuating assembly of FIG. 1. The head 120 can have one or more magnetic elements, such as the magnetic reader 122 and writer 124, which can operate individually, or concurrently, to write data to, or retrieve data from, an adjacent storage media, such as media 106 of FIG. 1. Each magnetic element 122 and 124 is constructed of a variety of shields that act to define a predetermined data track 126 of a corresponding data media on which data bits are sensed and programmed by the respective magnetic elements 122 and 124.

The magnetic reading element 122, as shown, has a magnetoresistive layer 130 disposed between leading and trailing shields 132 and 134. Meanwhile, the writing element 124 has a write pole 136 and at least one return pole 138 that creates a writing circuit to impart a desired magnetic orientation to the adjacent storage media. In the exemplary embodiment of FIG. 2, two return poles 138 are contactingly adjacent a non-magnetic spacer layer 140 and an ABS shield 142 that can be characterized as either uptrack or downtrack depending on the motion of the head.

The writing element 124 further includes a coil 144 that can be one or many individual wires and a yoke 146 that attaches to the write pole 136 and operates with the coil 144 to impart a magnetic flux that travels from the write pole 136 through conductive vias 148 to conclude at the return poles 138.

The transducing head 120, and each of the respective layers, has a predetermined thickness measured along a Y plane, and a stripe height 150 measured along an X plane. With respect to the shields 132 and 134, the respective shape and dimensions do not vary along the stripe height 150. As such, each shield maintains a predetermined thickness throughout the extent of each shield's stripe height, however, such shield configuration is not limited as one or more shields can have varying thicknesses, shapes, and features that modify the uniform thickness along the stripe height.

In operation, the write and return poles 136 and 138 channel magnetic flux to designated portions of an adjacent data medium to program a predetermined magnetic orientation. With ever increasing data recording speeds and magnetic flux intensities, the write pole 136 may have residual magnetic flux after a magnetic orientation has been recorded. Such residual magnetic flux can emanate from the write pole 136 to inadvertently program one or more data bits in an "erase after write" (EAW) condition. It is contemplated that installing a shunt in a write gap 152 between the write pole 136 and ABS shield 142 can dissipate residual magnetic flux and minimize EAW.

However, practical operation of a shunt magnetically connecting the write pole 136 and ABS shield 142 is hampered by reduced write field strength and gradient. As a result, reduction in EAW is counterbalanced by reduced magnetic writing efficiency. Thus, the ability to selectively activate and deactivate the magnetic properties of a shunt can enhance writer 124 performance through reduced EAW with minimal reduction in magnetic writing field and gradient. Consequently, a selectable magnetic insert positioned in the write gap 152 can provide advantageous magnetic writer 124 operation, as generally illustrated in FIG. 3.

Figure 3:
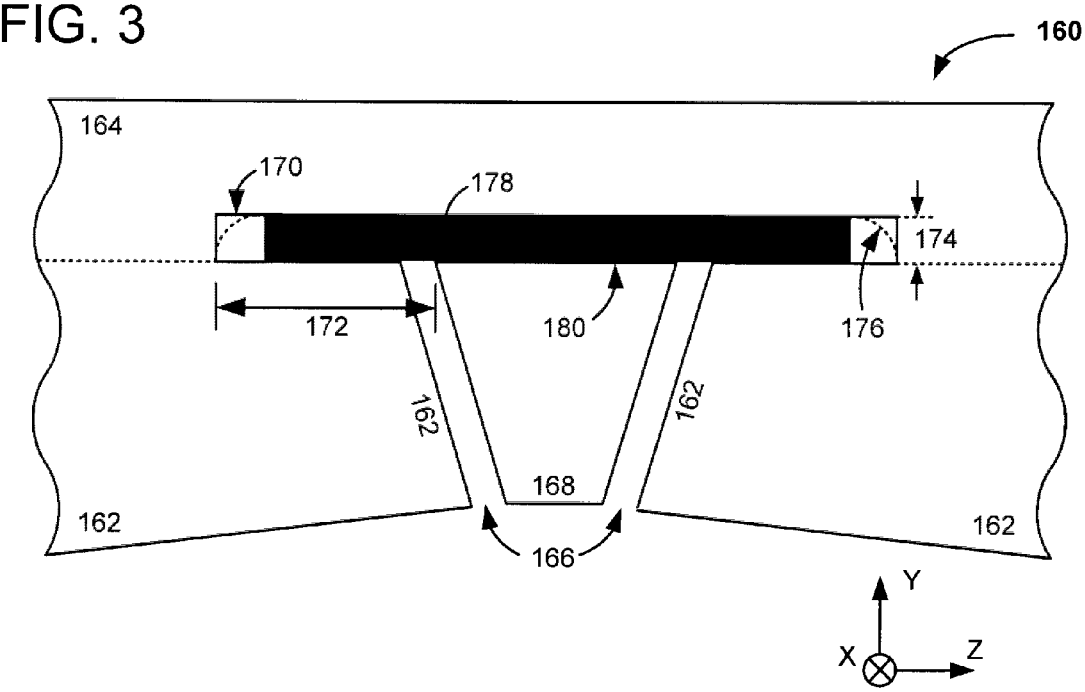
FIG. 3 shows a portion of the exemplary magnetic element of FIG. 2 as viewed from the air bearing surface (ABS).

In FIG. 3, a block representation of a portion of an exemplary magnetic element 160 is displayed as viewed from the ABS. It is to be understood that FIG. 3 is generally illustrated as aligned with a predetermined track where the bottom portion of the element 160 is uptrack and will encounter a magnetic bit before a downtrack portion at the top of the element 160. As a write pole 168 encounters a rotating magnetic media, side shields 162 work in concert with the trailing shield 164 to concentrate magnetic flux about the write pole 168 and define a write track.

As discussed above, the write pole 168 can be susceptible to EAW as residual magnetic flux is guided to the adjacent data media, despite the presence of one or more ABS shields. The magnetic element 160 illustrates a plurality of such ABS shields in the form of side shields 162 and a trailing shield 164 that can aid in precisely defining where the write pole 168 distributes magnetic flux, but fail to dissipate residual write pole flux that can cause EAW. It should be noted that the plurality of shields in the magnetic element 160 are unlimited in configuration and material composition as the shields can be a seamless piece or a lamination of various shields, as generally illustrated by the perforated lines separating the side and trailing shields 162 and 164.

The ABS shields 162 and 164 are configured, as shown in FIG. 3, with a side shield gap 166 that surrounds the write pole 168 with a region void of shielding material. In some embodiments, the write gap 166 provides a uniform distance between the write pole 168 and the side shields 162 while in other embodiments the side shield gap 166 provides varying distances between the side shields 162 and trailing shield 164. In the exemplary embodiment shown in FIG. 3, the side shield gap 166 between the write pole 168 and the trailing shield 164 has been configured into a letterbox gap 170. That is, portions of the ABS shields have been removed to provide the letterbox gap 170 that has a predetermined width 172 and height 174, a measured from the write pole 168.

The letterbox gap 170 can provide advantageous write pole performance through reduction in magnetic undershoot that can enhance data bit definition in high data bit density applications. The shape and dimensions of the letterbox gap 170 are not limited to a particular configuration and can be arranged to provide a variety of write pole 168 performance characteristics, as generally shown by the rounded lateral edges 176. The letterbox gap 170 is used to house an insert 178 that contacts the write pole 168 on a letterbox surface 180 and extends to contract both side shields 162 and the trailing shield 164. In some embodiments, the insert 178 is positioned in one, or both, side shield gap 166 to further reduce magnetic undershoot.

It should be noted that various configurations of the insert 178 and the letterbox 170 are non-limiting and any number of shapes, sizes, and orientations can be provide enhanced magnetic operation. For example, the element 160 can be configured to include the placement of the insert 178 in contact with the write pole 168 without a letterbox width, i.e. 172=0, and with more than one insert 178 contacting the write pole 168 in various locations.

While the insert 178 can contact each ABS shield 162 and 164, such physical contact is not required to magnetically couple the write pole 168 to the ABS shields 162 and 164 to provide increased protection against EAW. That is, the insert 178 can magnetically couple the write pole 168 to the ABS shields 162 and 164 with or without contacting them. By magnetically coupling the write pole 168 to the ABS shields 162 and 164, residual magnetic flux in the write pole 168 is directed to the shields 162 and 164 instead of the adjacent data storage media, which prevents inadvertent programming of data bits.

The insert 178 can be a variety of different materials and configurations that provide magnetic coupling that reduces or eliminated EAW. As shown, the insert 178 is has a continuously solid cross-section with orthogonal exterior surfaces and without apertures or appendages. In some embodiments, the insert 178 is configured to be partially or completely hollow with features, such as rounded exterior surfaces, to provide tuned magnetic coupling that allows for optimization of insert 178 performance. Hence, the insert 178 can be modified, as needed or desired, to magnetically couple the write pole 168 to one or more ABS shields 162 and 164 to protect against EAW.

Figure 4:
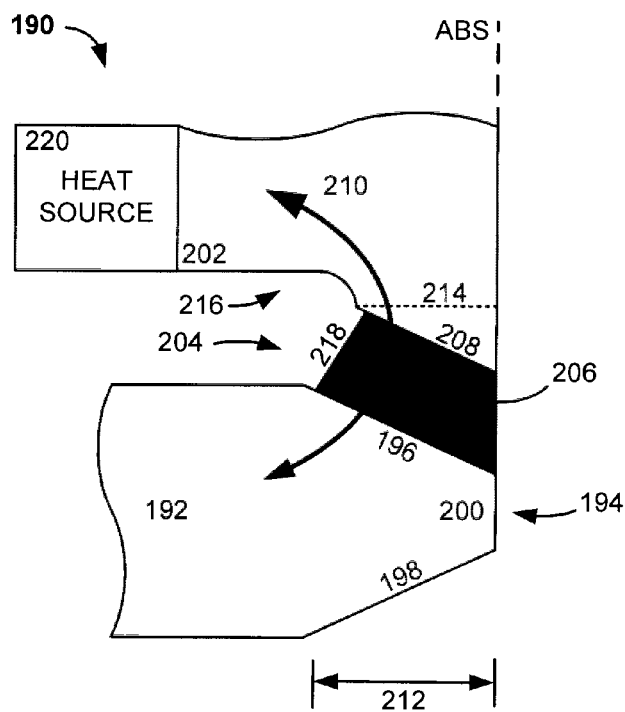
FIG. 4 displays an exemplary cross-section portion of the magnetic element of FIG. 3.

FIG. 4 displays a cross-sectional view of a portion of an exemplary magnetic element 190 that is capable of being used in the transducing head 120 of FIG. 2. The element 190 has a write pole 192 with a tapered tip 194 comprised of first and second tip surfaces 196 and 198 each with a predetermined taper angle that meet at an ABS tip surface 200 that is parallel to the ABS. A trailing shield 202 is also positioned on the ABS and adjacent the write pole 192 across a letterbox gap 204 that is filled with an insert 206 that contacts the ABS, first ABS tip surface 196 of the write pole 192, and letterbox surface 208 of the trailing shield 202.

The position of the insert 206 on the ABS while in connection with both the write pole 192 and trailing shield 202 allows for a magnetic flux dissipation path 210 to be as close to the ABS as possible so that residual magnetic flux does not bypass the path 210 to affect an adjacent data storage media. The insert 206 further has an angular orientation with respect to the ABS that substantially matches the taper angle of the first ABS tip surface 196 of the write pole 192. That is, the insert 206 extends from the ABS along the X axis with a stripe height 212 that forms a non-orthogonal angle with the ABS due to contact with the tapered first ABS tip surface 196 of the write pole 192.

It should be noted that the non-orthogonal orientation of the insert 206 with the ABS is not required or limited as the contact between the insert 206, write pole 192, and trailing shield 202 dictate the shape of the insert 206. As such, modification of the first ABS tip surface 196 or the letterbox surface 208 to have an orthogonal angular relationship with the ABS, as displayed by alternative letterbox surface 214, can correspond to some or all of the insert 206 being perpendicular to the ABS. However, the non-orthogonal angular relationship between the insert 206 and the ABS can allow the write pole tip 194 and trailing shield 202 to be constructed with the predetermined taper angle that provides advantageous precision and efficiency for data bit recording.

The configuration of the insert 206 and trailing shield 202 can further be modified in a variety of manners to more clearly define the dissipation path 210. One such modification is an undercut 216 that enlarges the letterbox gap 204 at a predetermined distance from the ABS. The increased distance between the write pole 192 and trailing shield 202 can aid in preventing magnetic shorts that can degrade data writing fields. Construction of the undercut 216 can correspond with various insert 206 configurations, such as, but not limited to, increased stripe height 212 and shaped rear insert surface 218 features that efficiently allow residual magnetic flux to flow along the dissipation path 210.

As discussed above, continual magnetic coupling the write pole 192 to a shield can prove to degrade data recording performance by reducing magnetic field strength and gradient. The magnetic tie between the write pole 192 and shields detrimentally funnels magnetic flux away from the data storage media during data programming situations where efficient and precise deposition of magnetic flux is of utmost importance, especially in reduced form factor data storage devices where write poles are below 50 nanometers in width.

Accordingly, the insert 206 can be configured to be selectively magnetic to allow activation and deactivation of the magnetic coupling between the write pole 168 and one or more ABS shields. By constructing the insert 206 of a metallic material that has a low magnetic moment and low Curie temperature, heat from a heat source 220 can activate or deactivate the magnetization of the insert 206 to respectively establish and remove magnetic coupling between the write pole 192 and at least the trailing shield 202.

In operation, the application of heat from the heat source 220 to the insert 206 quickly elevates the temperature of the insert 206 above its Curie temperature to make the insert 206 non-magnetic. The elevated temperature of the insert 206 can correspond with the decoupling of the write pole 192 from the ABS shields to allow magnetic flux to efficiently flow from the write pole 192 to an adjacent data storage media without substantial loss of magnetic write field and gradient.

Conversely, when the insert 206 has a temperature that is below its transition temperature, the insert 206 couples the write pole 192 to one or more ABS shields to provide a magnetic pathway directed away from an adjacent data storage media to allow for any residual magnetic flux present in the write pole 192 to dissipate without affecting the programmed data bits of the media.

Heat can be supplied to the insert 206 with various heat sources and in a variety of manners to activate or deactivate the insert's magnetism. One mechanism for supplying heat can be to divert energy from a writer coil, like coil 144 of FIG. 2. However, it has been observed to be difficult to control both timing and energy supplied to the insert, which results in minimal EAW protection. An independent preamp control circuit can further be used independently or in combination to accurately control the magnetic and nonmagnetic phase of the insert 206 at all times. The addition of a preamp circuitry, of course, adds complexity and cost.

The insert 206 can also be heated above its transition temperature during a write operation by fabricating a resistive heater near the insert 206 that is powered by a write coil current or an independent power source, such as a preamp. The insert's temperature can independently or supplementally increased with Joule heating by flowing current either diverted from a write coil or supplied by an independent power source. With such variety of heating means, fabrication and operation of the insert 206 can be accurately and quickly controlled to enhance performance in a variety of environments.

While these and various other heat supply sources can be utilized to raise the temperature of the insert 206 above a transition temperature, such as its Curie temperature, heat passing from the trailing shield to the write pole across the write gap through the insert 206 along dissipation path 210 efficiently provides heat without adding structural and operational disadvantages. Such efficient supply of heat allows for minimal delay in transitioning the insert 206 from magnetic to nonmagnetic, or vice versa.

Figure 5:
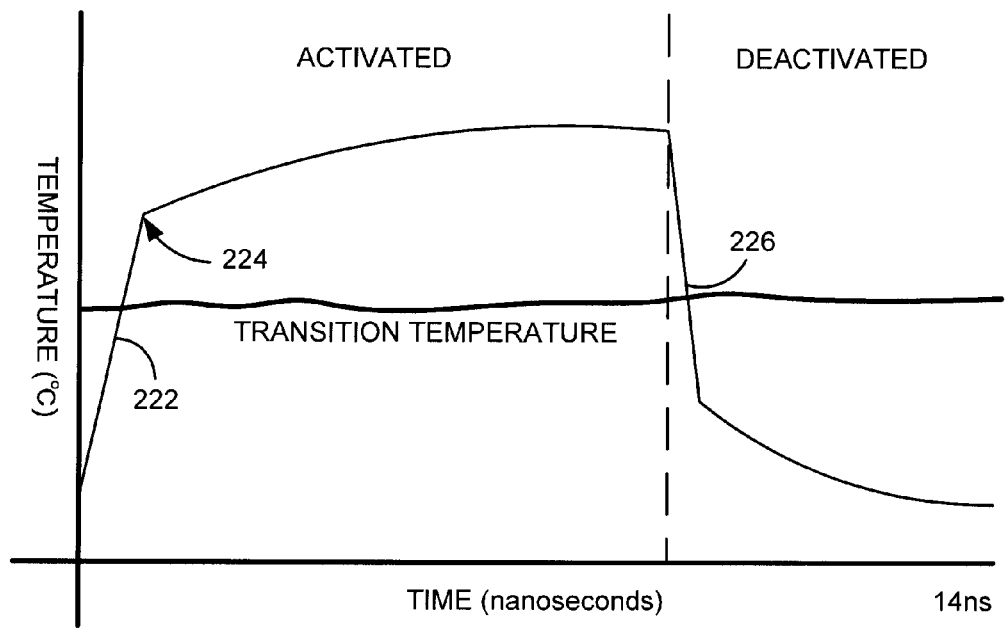
FIG. 5 plots exemplary magnetic element operational characteristics as temperature over time.

FIG. 5 generally graphs exemplary operational behavior for a magnetic element with a selectively magnetic insert similar or identical to the insert 206 of FIGS. 3 and 4. Initially, a write pole has a first temperature that is below the insert's transition temperature, which corresponds with the insert magnetically coupling the write pole to at least one adjacent ABS shield. As a magnetic write field of a predetermined intensity and duration flows through the write pole, heat is generated by various sources, as shown by line 222, which increases the contactingly adjacent insert's temperature above its transition temperature and induces the insert to become non-magnetic and uncouple the write pole from the previously coupled ABS shield.

Through material composition and heat source modulation, the insert's temperature can be maintained around a heated temperature 224 for a majority of the write field's duration. The end of the write field coincides with a removal of heat from the insert and rapid reduction in insert temperature below the insert's transition temperature, as generally illustrated by line 226. The cooling of the insert induces magnetism to return to the insert and couple the write pole to the ABS shields to dissipate any residual magnetic flux present in the write pole.

In various non-limiting embodiments, heating the insert above its transition temperature is characterized as "activated" with the application of approximately 5 mA to the write pole through the write field while cooling the insert below the Curie temperature is characterized as "deactivated." The various embodiments can further entail the an operational cycle of 14 nanoseconds where the insert is activated for 9 nanoseconds and deactivated for 5 nanoseconds, as shown in FIG. 5, which can provide synchronous operation of the insert with an operational waveform below 2 nanoseconds. However, the operational timeframe is not limited and the graph of FIG. 5 is merely a general illustration of the precise transition timeframe possible during insert operation.

With further regard to FIG. 5, the operation of the insert can be modified in both duration and intensity to provide magnetic coupling and decoupling at any desired time. The operation of the insert can further be modified with a variety of heat sources and control circuitry that allow the predefined activation of the insert and coupling of the write pole to the ABS shields. In an exemplary modified operation, the insert is maintained above its transition temperature during both data writing and data reading functions until the writing of multiple data bits corresponds to a write pole field intensity that is greater than a predetermined threshold. The increased magnetic field intensity corresponds to the removal of heat and the lowering of the insert's temperature below its Curie temperature.

The position of the insert in the letterbox gap on the ABS, as displayed in FIGS. 3 and 4, allows for the supply of supplemental heat to and efficient Joule heating of the insert through the thermal conductivity of the ABS shields and write pole. For example, energy from a heater that controls the clearance between a transducing head and data storage media is conducted through the ABS shields to the insert. The position of the insert in the narrow write gap on the ABS further allows for quick cooling due to increased surface area contact with the ambient air. With such positioning and operational behavior, the insert's temperature efficiently raises and lowers to precisely activate and deactivate the insert.

Figure 6:
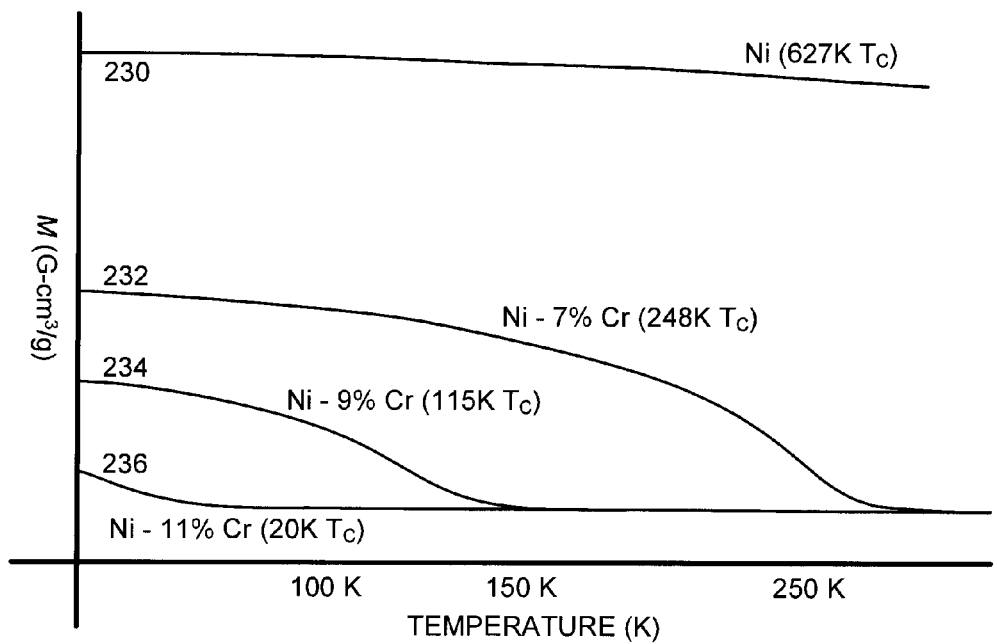
FIG. 6 graphs Curie temperature characteristics of exemplary materials capable of being used in the magnetic element of FIG. 3.

Such operational behavior can be tuned and adjusted through modification of the insert's material composition to provide enhanced performance in a variety of different environments. FIG. 6 generally illustrates various material characteristics of $Ni_{1-X}Cr_X$ alloys that can be utilized alone or in combination to construct an exemplary magnetically selectable insert. Line 230 displays the mass magnetization of Ni versus temperature measured in an applied magnetic field of 1 kOe applied parallel to plane. As can be appreciated, a magnetization of approximately 0.6 Tesla is maintained throughout a range of heating from 0 Kelvin to 300 Kelvin.

While not shown in FIG. 6, the approximate magnetization of Ni would continue to its Curie temperature of roughly 627 Kelvin, which would correspond to a selectively magnetic insert that is difficult to precisely heat and cool due to the high amount of heat needed to reach the Curie temperature. In an effort to lower the magnetization and Curie temperature of the Ni, approximately 7% Chromium is added. The resultant alloy has a Curie temperature of 248 Kelvin and a steadily decreasing magnetization above 100 Kelvin, as shown by line 232.

An increase in the Chromium percentage in the Ni alloy further corresponds to a lower Curie temperature and magnetization, as illustrated by line 234 where an 9% Chromium alloy has near zero magnetization above 125 Kelvin and a 115 Kelvin Curie temperature. With a low magnetic moment, the coupling of the write pole to one or more ABS shields can be facilitated without inducing side track erasure of data bits on adjacent data tracks. Thus, a NiCr alloy that can provide low magnetic moments with a low Curie temperature can allow accurate and precise selection of the letterbox insert without inadvertently affecting proximal data bits.

In some embodiments, an selectable insert is tuned through material construction to have less than or equal to a 0.4 T magnetic moment while having a Curie temperature that is slightly over the ambient operating temperature of the data storage device in which the magnetic element is to be used. Such tuning can allow for a small amount of heating and cooling to quickly activate and deactivate the insert to more accurately control residual magnetic flux and EAW. Line 236 displays an alloy composition that meets such tuned material construction as 11% Chromium provides a Curie temperature of 115 Kelvin and a magnetization that approaches zero around 40 Kelvin.

It should be noted that a number of different alloys, materials, magnetic moments, and Curie temperatures can be advantageously used to construct a selectable insert. However, testing has found that materials with Curie temperatures above 400 Kelvin and magnetic moments above 0.4 Tesla increase the activation and deactivation volatility, which can correspond to a detrimental reduction of write field, write gradient, and data bit accuracy. The various abilities of tuning the insert further extend to the construction of a magnetic element that includes the selectable insert, as illustrated in FIG. 7.

Figure 7:
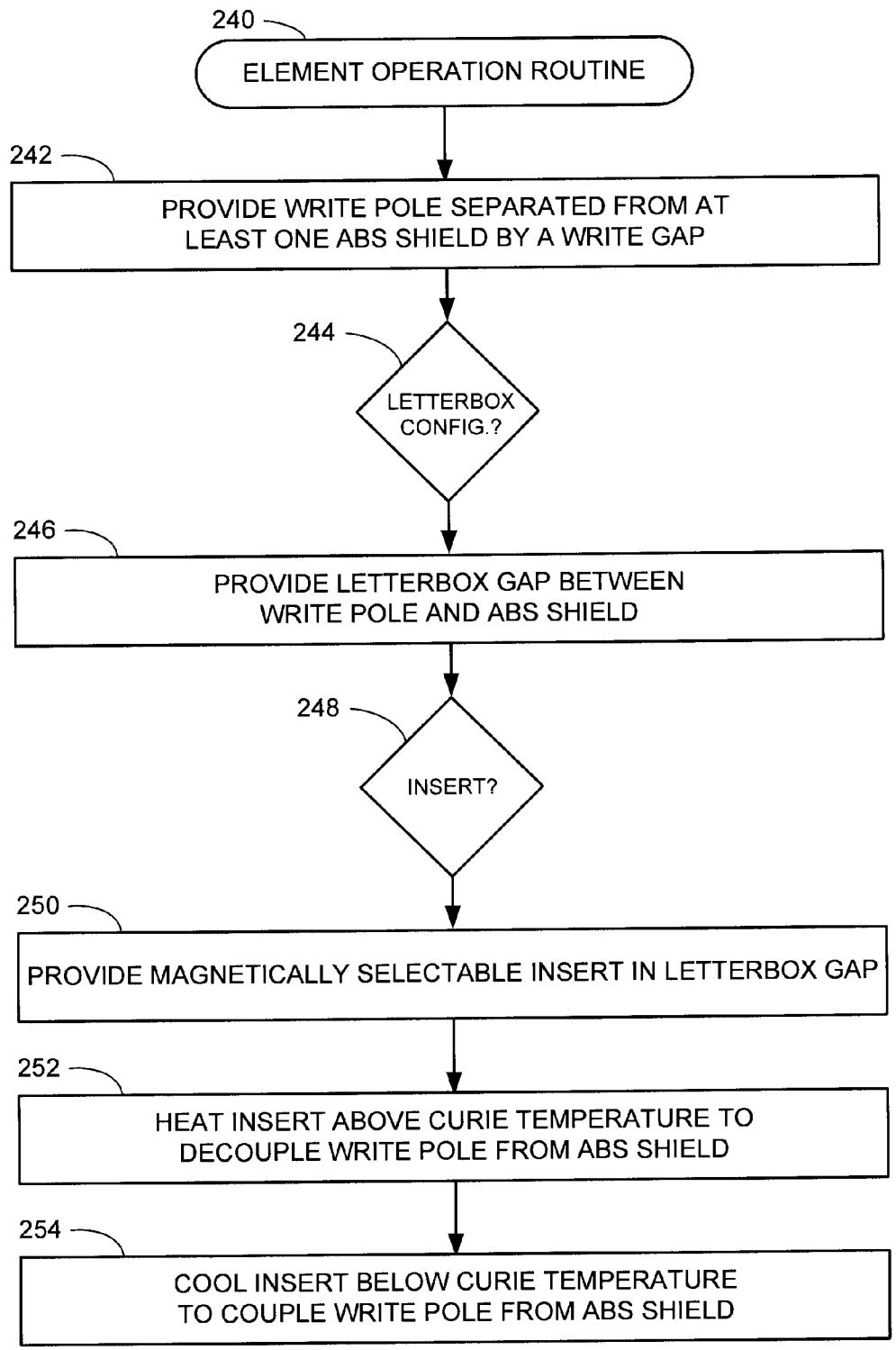
FIG. 7 provides a flowchart mapping an exemplary element operation routine conducted in accordance with various embodiments of the present invention.

In FIG. 7, an exemplary magnetic element operation routine 240 is provided as conducted in accordance with various embodiments of the present invention. The routine 240 begins by providing a write pole in step 242 positioned on the ABS and separated from at least one ABS shield by a write gap. The write gap and ABS shield allow the write pole to accurately record data bits to a predetermined area of an adjacent data storage media. Decision 244 evaluates how to configure a letterbox gap in the write gap to enhance the accuracy of data bit recording through improved data bit shielding.

As discussed in relation to FIGS. 3 and 4, the letterbox gap can be configured in a number of different sizes, orientations, and shapes. Decision 244 determines the dimensions of the letterbox gap needed to provide the desired performance data recording characteristics and proceeds to step 246 where the letterbox gap is formed between the write pole and at least one of the ABS shields. With the letterbox gap formed, the routine 240 advances to decision 248 where the construction of the magnetically selectable insert is analyzed. Decision 248 evaluates the material, dimensions, and orientation with respect to the ABS to determine the optimal insert and then provides such an insert in the letterbox gap in step 250 to contact both the write pole and at least one ABS shield.

With decisions 244 and 248, routine 240 can tune and optimize the construction and operation of the magnetic element to conform to an unlimited variety of performance parameters and characteristics. Step 252 utilizes the magnetic element by heating the insert above its Curie temperature so that the insert becomes nonmagnetic and decouples the write pole from the ABS shield(s). Subsequently in step 254, heat is removed from the insert to induce cooling to a temperature below the insert's Curie temperature and magnetism that couples the write pole to the ABS shield(s).

Through controlled operation, steps 252 and 254 can be cycled an unlimited number of times to program data and immediately dissipate residual magnetic flux in the write pole by providing a dissipation pathway from the write pole to at least one adjacent shield. As such, the routine 240 can reduce or eliminate EAW that often plagues magnetic elements with miniscule form factors. However, the routine 240 is not limited to the process shown in FIG. 7 as the various decisions and steps can be omitted, changed, and added. For example, steps 254 and 254 can be reversed as the insert is deactivated by operating at a temperature below its Curie temperature before heat is added to activate the insert by bringing its temperature above the Curie temperature.

It can be appreciated that the configuration and material characteristics of the magnetic element described in the present disclosure allows for advantageous magnetic programming through reduction of erasure after writing. Positioning a selectively magnetic insert in a letterbox gap between a write pole and an ABS shield allows for controlled magnetic coupling of the write pole to the shield to create a dissipation pathway for residual magnetic flux in the write pole. Moreover, the ability to tune and optimize the configuration of the letterbox and insert provides increased insert activation precision that can conform to a variety of performance characteristics. In addition, while the embodiments have been directed to magnetic sensing, it will be appreciated that the subject matter can readily be utilized in any number of other applications, including data storage device applications.

It is to be understood that even though numerous characteristics and advantages of various embodiments of the present invention have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A magnetic writing apparatus comprising a write pole in contact with a insert layer with selectable magnetic and nonmagnetic states, the insert layer configured to be in the nonmagnetic state to decouple the write pole from at least one adjacent shield in response to the write pole conducting current from a power source.

2. The apparatus of claim 1, wherein the insert layer is positioned in a letterbox gap defined by a leading shield and at least one side shield.

3. The apparatus of claim 1, wherein the write pole is contactingly adjacent a leading shield and at least one side shield.

4. The apparatus of claim 3, wherein the write pole, leading shield, magnetic insert, letterbox gap, and at least one side shield are each positioned on an air bearing surface (ABS).

5. The apparatus of claim 1, wherein the insert layer deactivates to the magnetic state in response to current being removed from the write pole to magnetically couple the write pole to the leading shield and at least one side shield.

6. The apparatus of claim 5, wherein the insert layer extends from the ABS at a predetermined taper angle.

7. The apparatus of claim 5, wherein the insert layer is below its Curie temperature while current is removed from the write pole.

8. The apparatus of claim 1, wherein the write pole is disposed between first and second side shields that each contact the insert layer.

9. The apparatus of claim 1, wherein heat generated by the write pole conducting current activates the insert layer to the nonmagnetic state.

10. The apparatus of claim 1, wherein the write pole conducting current heats the insert layer above the insert's Curie temperature through Joule heating.

11. The apparatus of claim 1, wherein the insert layer has a magnetic moment less than or equal to 0.4 Tesla.

12. The apparatus of claim 1, wherein the write pole is separated from the at least one side shield by a write gap.

13. A method a magnetic writing comprising:
providing a write pole in contact with an insert layer selectable to magnetic and nonmagnetic states; and
decoupling the write pole from at least one adjacent shield via configuring the insert layer to the non-magnetic state by conducting a current from a power source through the write pole.

14. The method of claim 13, wherein conducting current through the write pole passes current across through a write gap to heat the insert layer above its Curie temperature.

15. The method of claim 14, wherein the current is conducted from a heat source that adjusts the clearance between the write pole and an adjacent data storage media.

16. The method of claim 13, further comprising coupling the write pole to the at least one adjacent shield by removing current from the write pole to provide a dissipation pathway for residual magnetic flux to flow away from the write pole.

17. The method of claim 16, wherein the coupling step reduces an amount of residual magnetic flux from reaching an adjacent data storage media.

18. The method of claim 16, wherein a controller deactivates a heat source to transition from passing current through to removing current from the write pole.

19. An magnetic writing element comprising:
an insert layer positioned in a letterbox gap on an air bearing surface (ABS) to contact a write pole and at least one shield, the insert layer extending from the ABS in the letterbox gap to have an angular relationship to the ABS; and
a heat source that elevates the temperature of the insert layer above its Curie temperature to make the insert layer become a nonmagnetic state and decouple the write pole from the at least one adjacent shield.

20. The magnetic writing element of claim 19, wherein removal of heat from the insert layer corresponds with a magnetic state that couples the write pole to the at least one shield.

* * * * *